(12) United States Patent
Yamada

(10) Patent No.: US 11,720,306 B2
(45) Date of Patent: *Aug. 8, 2023

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Kazutaka Yamada, Nagakute (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/855,903

(22) Filed: Jul. 1, 2022

(65) Prior Publication Data
US 2022/0334784 A1 Oct. 20, 2022

Related U.S. Application Data

(63) Continuation of application No. 17/200,977, filed on Mar. 15, 2021, now Pat. No. 11,379,170, which is a
(Continued)

(30) Foreign Application Priority Data

Mar. 28, 2019 (JP) .................. 2019-063907

(51) Int. Cl.
*G06F 3/12* (2006.01)
*H04N 1/00* (2006.01)

(52) U.S. Cl.
CPC .......... *G06F 3/1257* (2013.01); *G06F 3/1208* (2013.01); *G06F 3/1256* (2013.01); *H04N 1/0044* (2013.01)

(58) Field of Classification Search
CPC .... G06F 3/1257; G06F 3/1256; G06F 3/1208; H04N 1/0044
(Continued)

(56) References Cited

U.S. PATENT DOCUMENTS 8,922,795 B2 12/2014 Miller et al.
8,922,837 B2 * 12/2014 Yoshida .................. H04N 1/54
358/3.27

(Continued)

FOREIGN PATENT DOCUMENTS

JP 2010-035021 A 2/2010
JP 2013-058090 A 3/2013
(Continued)

OTHER PUBLICATIONS

International Search Report and the Written Opinion dated Mar. 10, 2020 of the International Searching Authority issued in the PCT application No. PCT/JP2020/006090 together with English translations.

(Continued)

*Primary Examiner* — Neil R McLean
(74) *Attorney, Agent, or Firm* — Scully, Scott, Murphy & Presser, PC

(57) ABSTRACT

When an editing APP receives a print instruction while designating an image to be printer, a supporting program receives a specific parameter and processes intermediate image data, and a general-use printing program generates print data based on the processed intermediate image data and transmits the print data to a printer. On the other hand, when the editing APP receives a preview instruction while designating an image to be printed, the supporting program receives a specific parameter and processes intermediated (Continued)

image data. Then, the general-use printing program responds to the editing APP without transmitting print data to the printer.

12 Claims, 7 Drawing Sheets

Related U.S. Application Data continuation of application No. 16/795,722, filed on Feb. 20, 2020, now Pat. No. 10,949,149.

(58) Field of Classification Search
USPC .......................................................... 358/1.15
See application file for complete search history.

(56) References Cited

U.S. PATENT DOCUMENTS

| | | | |
|---|---|---|---|
| 9,658,806 | B2 | 5/2017 | Fallon et al. |
| 2010/0027059 | A1 | 2/2010 | Ebi |
| 2013/0063742 | A1 | 3/2013 | Kikuchi |
| 2017/0180576 | A1 | 6/2017 | Kaneda |
| 2017/0223210 | A1 | 8/2017 | Yamada |
| 2018/0039459 | A1 | 2/2018 | Chang et al. |
| 2019/0294386 | A1* | 9/2019 | Iwamoto ............... G06F 3/1204 |

FOREIGN PATENT DOCUMENTS

| | | |
|---|---|---|
| JP | 2015-041268 A | 3/2015 |
| JP | 2017-134718 A | 8/2017 |

OTHER PUBLICATIONS

Notice of Allowance dated Aug. 14, 2020 in parent U.S. Appl. No. 16/795,722.
Notice of Allowance dated Nov. 16, 2020 in parent U.S. Appl. No. 16/795,722.
Office Action dated Oct. 13, 2021 from parent U.S. Appl. No. 17/200,977.
Notice of Allowance dated Mar. 3, 2022 from parent U.S. Appl. No. 17/200,977.

* cited by examiner

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application is a continuation application of U.S. Ser. No. 17/200,977 filed on Mar. 15, 2021, which is a continuation of U.S. Ser. No. 16/795,722 filed on Feb. 20, 2020, now U.S. Pat. No. 10,949,149 granted on Mar. 16, 2021 and claims priority under 35 U.S.C. § 119 from Japanese Patent Application No. 2019-063907 filed on Mar. 28, 2019. The entire subject matter of each of which is incorporated herein by reference.

RELATED ART

There has been widely known a technique to control a printer from an information processing apparatus such as a personal computer, a configuration of installing a printer driver in the information processing apparatus, generating print data using the printer driver and transmitting the print data to the printer. The printer driver is provided by a manufacturer of the printer and is adapted to various functions the printer has, and thus can make full use of the printer.

SUMMARY

Recently, a technique of controlling a printer using a general-use printing program which is standardly implemented in an operating system (OS), without using the above-mentioned printer driver, has been in practical use. According to such a technique, when a printer is detected, the OS associates a printer with the OS-standard general-use printing program. Thereafter, it becomes possible that, when the OS receives a print instruction corresponding to the printer, printing is executed using the OS-standard general-use printing program, without using the printer driver.

Even in the printing using the above-mentioned OS-standard general-use printing program, as with the printer driver, it is desirable that a processing function for generating print data in which processes such as a magnification/reduction process and a combining process are applied to an image is supported. If the general-use printing program supports such processing function, it is possible that processes that are not intended by the user are applied to the print data due to setting mistake by the user or the like. In this case, even if print data to which such processes are applied is transmitted to a printer, a print product that the user desires will not be output and expendable supplies will be wastefully consumed.

The present specification discloses a technique of reducing printing based on an image to which processes that are not intended by the user are applied in an information processing apparatus in which an OS-standard general-use printing program is implemented.

According to aspects of the present disclosure, there is provided a non-transitory computer-readable recording medium for an information processing apparatus, the information processing apparatus having a controller, a general-use printing program being implemented in an operating system of the information processing apparatus, an application program being implemented in the information processing apparatus, the recording medium containing computer-executable programs realizing a supporting program corresponding to a printer connectable to the information processing apparatus. The supporting program causing, when executed by the controller, the information processing apparatus to perform a receiving process when the general-use printing program receives a particular instruction from the application program, the application program being configured to input the particular instruction to the general-use printing program in a state where an image to be printed being designated through the application program, the receiving process being a process of receiving a processing setting used for processing intermediate image data, the intermediate image data being data output from the general-use printing program, the intermediate image data being image data indicating the designated image, the particular instruction being an instruction to execute a particular process regarding the designated image, and a processing process of processing the intermediated image data based on the received processing setting, the intermediate image data being data output from the general-use printing program, the processing setting being setting received in the receiving process, the processed intermediate image data being output to the general-use printing program, the intermediate image data indicating the designated image, the general-use printing program selectively executing, after the processing process, one of a print data transmitting process and a response outputting process, the print data transmitting process including a process of generating print data based on the processed intermediate image data and transmitting the generated print data to the printer, the response outputting process being a process of transmitting a response to the application program without transmitting print data to the printer.

BRIEF DESCRIPTION OF THE ACCOMPANYING DRAWINGS

DETAILED DESCRIPTION OF THE EMBODIMENT

First Embodiment

Hereinafter, referring to the accompanying drawings, a print system using programs according to the first embodiment will be described in detail. The present embodiment shows a concrete example of the print system including a personal computer (hereinafter, referred to as a "PC") and a printer.

Figure 1:
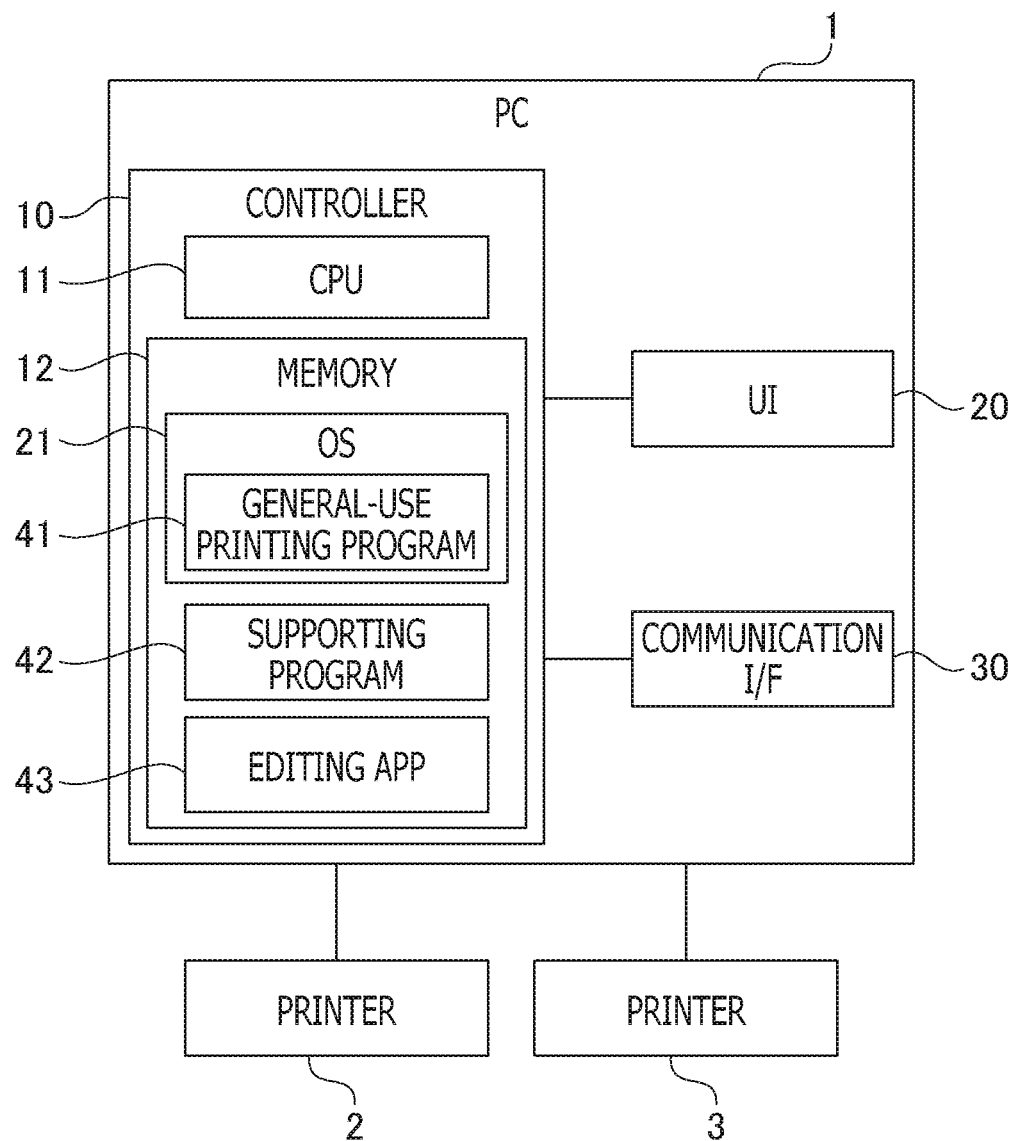
FIG. 1 is a block diagram showing an electrical configuration of a print system of a first embodiment.

An example of a configuration of a print system in which programs according to the first embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication. it is noted that a plurality of printers 2 may be connected to the PC 1.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard and/or a mouse having an input receiving function. The UI 20 is an example of a display device.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM, a non-volatile memory and a buffer of the CPU 11, and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer driver, which is supplied by a printer vender, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware, such as the printer 2, subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 adapted to the printer 2 is registered with the platform, the OS 21 downloads the supporting program 42 from a sever in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, for example, the editing APP 43 receives, through the UI 20, a print instruction which causes the printer 2 to execute printing. The editing APP 43 further receives, through the UI 20, a preview instruction for causing the UI 20 to display a preview of an image to be printed.

It is noted that processes and respective process steps in the sequential charts described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

Next, a configuration of the supporting program 42 and a printing procedure including processes based on the supporting programs 42 of the present embodiment will be generally described with reference to sequential charts shown in FIGS. 2 and 3. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

The supporting program 42 includes a first interface and a second interface as interfaces for receiving execution commands. The first interface is an interface configured to receive a execution command from the general-use printing program 41. When the editing APP 43 receives the print instruction which designates the printer 2 corresponding to the supporting program 42 and outputs a print execution notification to the general-use printing program 41, the supporting program 42 receives the print execution notification through the first interface. The second interface is an interface configured to receive the execution command from the general-use printing program 41. When the editing APP 43 receives the preview instruction and outputs, to the general-use printing program 41, an activation request for requesting to activate the supporting program 42, the supporting program 42 receives the execution command through the second interface. The print instruction is an example of a specific instruction or a first instruction, and the preview instruction is an example of the specific instruction or a second instruction.

Figure 2:
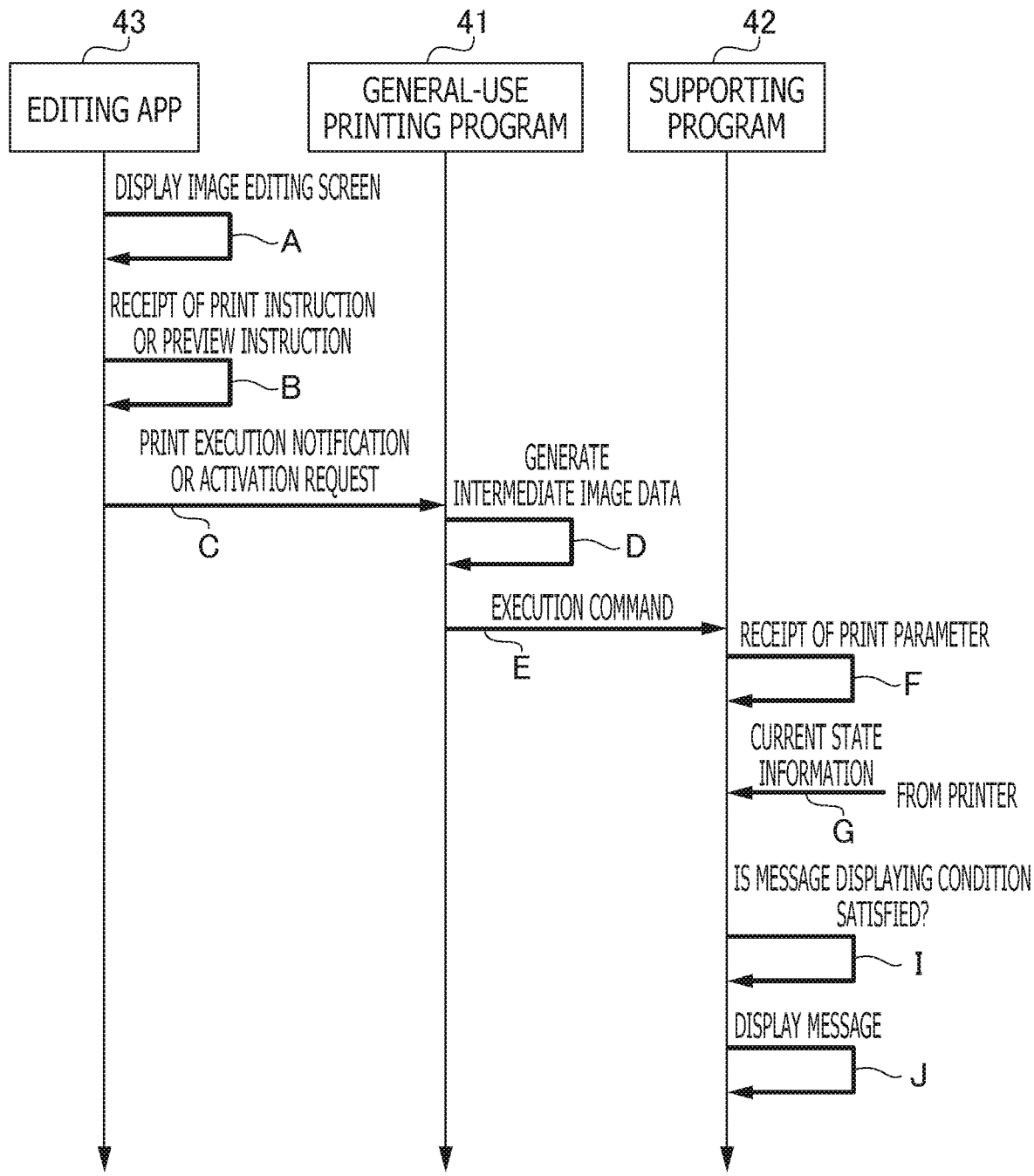
FIG. 2 is a sequential chart showing an example of an order of operations by respective programs.

As shown in FIG. 2, the editing APP 43 causes the UI 20 to display an image editing screen (arrow A). In the image editing screen, for example, a document which has been edited using the editing APP 43 or a picture which has been read using the editing APP 43 is displayed as an image. Upon receiving an instruction to display a print setting screen through the image editing screen, the editing APP 43 causes the UI 20 to display the print setting screen for receiving a selection of a printer to be caused to execute printing and settings of the print parameters such as sheet size and image quality. In the print setting screen, for example, a print button for instructing to execute printing and a preview button for instructing to display a preview are displayed. The editing APP 43 receives the print instruction from the user through the operation of the print button through the UI 20 (arrow B). The editing APP 43 receives the preview instruction from the user through the operation of the preview button through the UI 20 (arrow B).

The print parameters include general-use parameters to which the general-use printing program 41 is adapted and specific parameters to which the general-use printing program 41 is not adapted. The specific parameters are, for example, intrinsic parameters intrinsic to a printer and. The general-use parameters are, for example, parameters for setting the sheet size, the image quality and the color/monochromatic printing. The specific parameters are, for example, parameters for setting watermarks and stapling. The editing APP 43 may receive, through the print setting screen, only the general-use parameters or may receive both the general-use parameters and the specific parameters.

When the print instruction is received, the editing APP 43 delivers, to the OS 21, the print execution notification which includes a content of the print instruction and which is for causing the general-use printing program 41 to execute a printing process. When the preview instruction is received, the editing APP 43 delivers, to the OS 21, the activation request which includes a content of the preview instruction and which is for requesting to activate the supporting program 42. It is noted that, in FIG. 2, operations of the OS 21 are omitted.

When the print execution notification or the activation request is received, the OS 21 activates the general-use printing program 41 and delivers the print execution notification or the activation request to the general-use printing program 41 (arrow C). The general-use printing program 41 can obtain various pieces of information included in the print instruction or the preview instruction from the print execution notification or the activation request. For example, the general-use printing program 41 obtains image data of the image displayed in the image editing screen as image data of an image subjected to be printed or subjected to be displayed as a preview. The general-use printing program 41 can further obtain information indicating a printer to be caused to execute printing, information indicating print parameters that have been input to the print setting screen, and information identifying a user who instructed to execute printing. It is noted that, as will be described later, the supporting program 42 can use these pieces of information as well.

The general-use printing program 41 generates intermediate image data by converting a format of the image data included in the print execution notification or the activation request to a format of the intermediate image data and generates print job data including the intermediate image data (arrow D). There are various types of image data as the image data included in the editing APP 43, and the general-use printing program 41 converts the received image data to the intermediate image data that is suitable for the generation of the print data. The general-use printing program 41 generates the intermediate image data by using the general-use parameters only. It is noted that, if the image data included in the print execution notification is suitable for the generation of the print data, the generation of the intermediate image data may be omitted and the image data may be directly used as the intermediate image data. The intermediate image data is, for example, XPS format data. It is noted that the print job data includes, apart from the intermediate image data, the print parameters set through the editing APP 43.

Further, the general-use printing program 41 identifies, based on the information included in the print execution notification, a printer designated as a device to be caused to execute printing. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, the general-use printing program 41 activates the supporting program 42 prior to starting generation of the print data by the general-use printing program 41 by outputting an execution command for causing the supporting program 42 to execute processes (arrow E).

When the print execution notification is received, the general-use printing program 41 delivers an execution command to the first interface of the supporting program 42. On the other hand, when the activation request is received, the general-use printing program 41 delivers an execution command to the second interface of the supporting program 42. It is noted that the supporting program 42 may include only one interface for receiving execution commands. In this case, when receiving the print execution notification, the general-use printing program 41 may be configured to deliver, to the supporting program 42 through the interface, an execution command to which information indicating that the print execution notification is received is attached. Further, when receiving the activation request, the general-use printing program 41 may deliver, to the supporting program 42 through the interface, an execution command to which information indicating that the activation request is received is attached.

When the supporting program 42 receives the execution command through the first interface or the second interface, the supporting program 42 displays a print parameter editing screen for receiving settings of the print parameters and receives the settings of the print parameters through the UI 20 (arrow F). The process at the arrow F is an example of a receiving process, and the print parameters received through the process at the arrow F are examples of a processing setting. For example, the supporting program 42 causes the UI 20 to display a print parameter editing screen for receiving settings of the specific parameters of the printer 2 corresponding to the supporting program 42 and receives the settings of the specific parameters. It is noted that the supporting program 42 may receive settings of both the general-use parameters and the specific parameters through the print parameter editing screen or may display different print parameter setting screens for receiving the settings of the general-use parameters and for receiving the settings of the specific parameters.

Figure 4A:
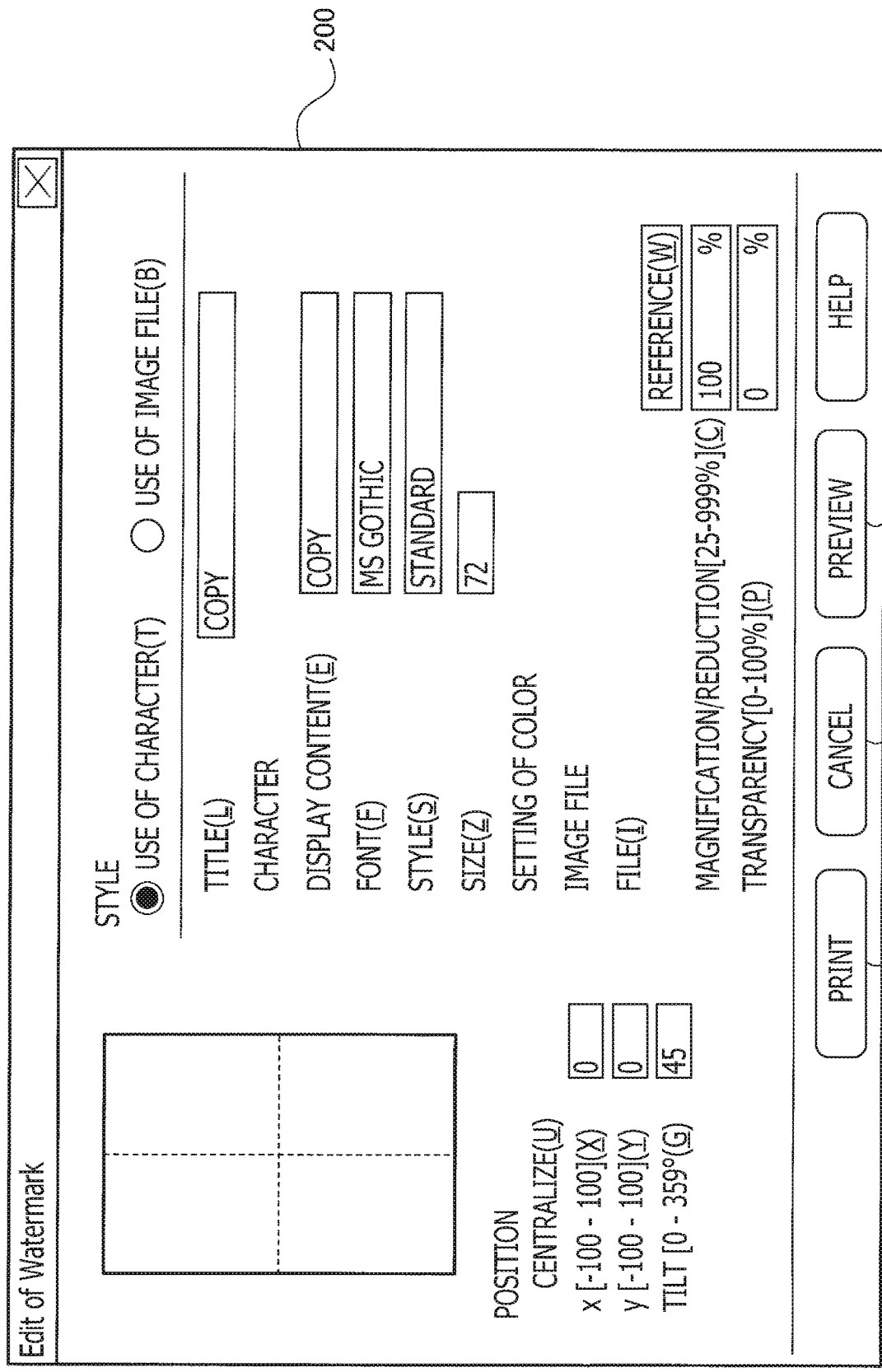
FIGS. 4A-4C are diagrams of a UI showing examples of screens to be displayed.

As the print parameter editing screen for receiving the settings of the specific parameters, the supporting program 42 causes the UI 20 to display, for example, a watermark editing screen 200 shown in FIG. 4A. For example, the supporting program 42 displays, on the watermark editing screen 200, specific parameters for a watermark which have been set by operating the watermark editing screen 200 through the UI 20. Further, the supporting program 42 receives settings of a watermark by storing, in the memory 12, the specific parameters that are displayed in the watermark editing screen 200 in response to operation of a print button 201 through the UI 20.

Based on the print parameters of which settings have been received through the print parameter editing screen, the supporting program 42 processes the print parameters attached to the execution command. For example, the supporting program 42 adds print parameters of which settings have been newly received to the print parameters attached to the execution command and/or rewrites the print parameters attached to the execution command with print parameters of which settings have been newly received. It is noted that, at the arrow F, the supporting program 42 may receive the print parameters attached to the execution command as it is.

The supporting program 42 which received the settings of the print parameters at the arrow F obtains current state information indicating current state and settings of the printer 2 from the printer 2 through the communication I/F 30 (arrow G). The current state information includes, for example, status information indicating current state of the printer 2 and setting information indicating settings that are currently stored in an internal memory of the printer 2. The status information includes, for example, job information concerning printing operations and information indicating whether there remains staple needles. The setting information includes, for example, information concerning sheet sizes of respective trays and information concerning whether there are finisher functions.

The supporting program 42 determines whether a message displaying condition is satisfied (arrow I). Specifically, for example, the supporting program 42 checks whether one or more specific settings are made by the print parameters. One or more specific settings for displaying messages are stored in the supporting program 42 in advance. For example, settings which designate high quality papers such as "postcard" are stored in the supporting program 42 as the specific settings. When the print parameters include a parameter indicating "postcard" being the specific setting, the supporting program 42 determines that the message displaying condition is satisfied. In this case, the supporting program 42 causes the UI 20 to display a dialogue 110 shown in FIG. 5A and displays a message 114 for making the user confirm whether to continue printing (arrow J).

Also, for example, the supporting program 42 compares settings indicated by the print parameters of which settings have been received at the arrow F and settings indicated by the current state information obtained at the arrow G to check whether the settings indicated by the print parameters and the settings indicated by the current state information coincide or not. For example, if the type of sheet indicated by the print parameter is "glossy paper" whereas the type of sheet included in the settings indicated by the current state information is "standard paper" and thus they do not coincide, the supporting program 42 determines that the message displaying condition is satisfied. In this case, the supporting program 42 causes the UI 20 to display a dialogue 120 shown in FIG. 5B and displays a message 124 notifying the mismatch of the settings (arrow J).

The dialogue 110 includes a continue button 111, a cancel button 112 and a reset button 113. The dialogue 120 includes a continue button 121, a cancel button 122 and a reset button 123. In order to instruct to execute printing on the postcard or to give permission to print on the standard paper, the user operates the continue button 111 or 121 through the UI 20.

Figure 3:
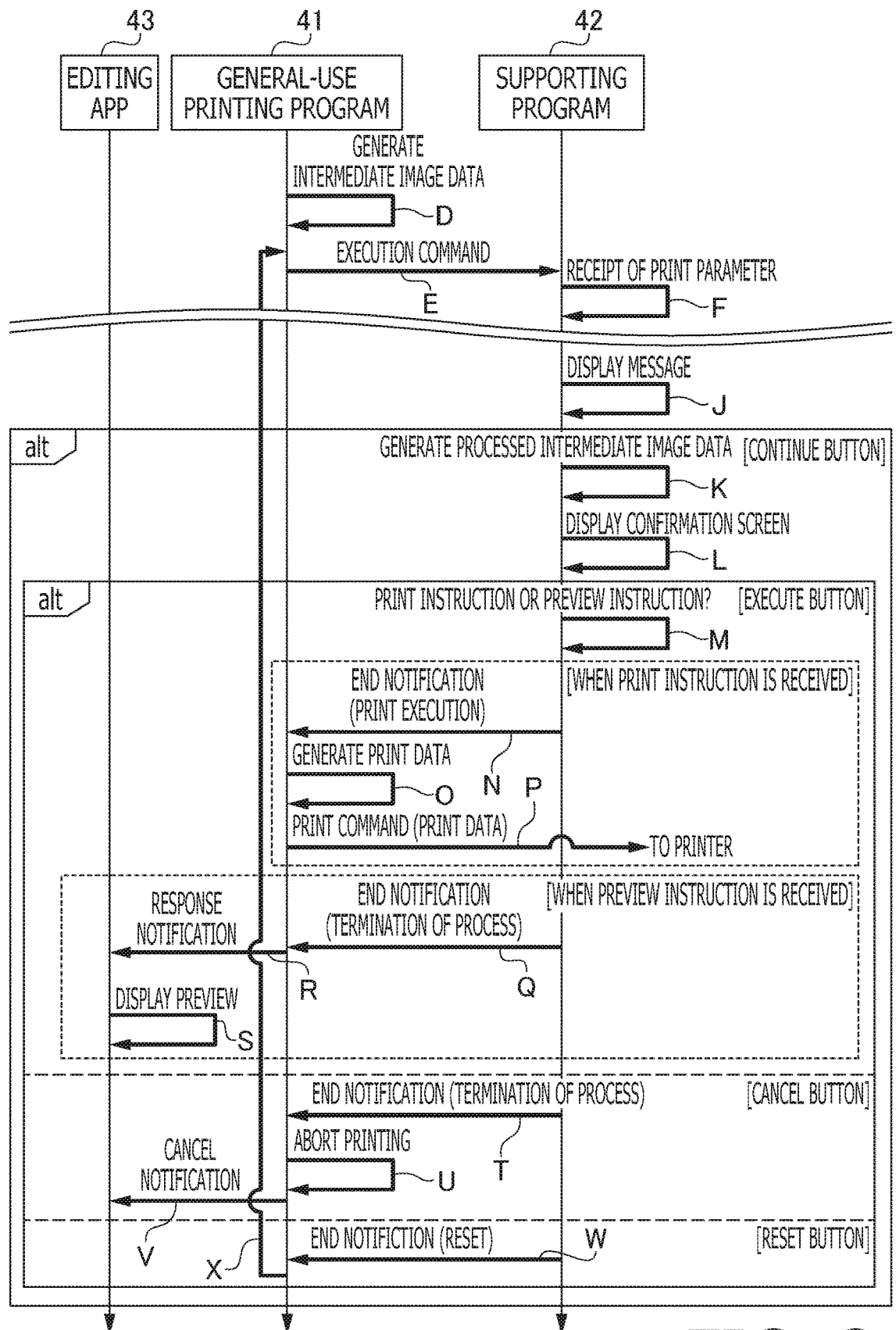
FIG. 3 is a sequential chart showing an example of an order of operations by respective programs.

As shown in FIG. 3, when an operation of the continue button 111 or the continue button 121 is received, the supporting program 42 generates processed intermediate image data (arrow K). For example, if a setting of a watermark is received at the arrow F, in accordance with settings of the watermark, the supporting program 42 executes a process for combining the watermark to an image indicated by the intermediate image data generated by the general-use printing program 41. It is noted that, when the message displaying condition is not satisfied, that is, for example, when settings indicated by the print parameters do not include any specific setting or when settings indicated by the print parameters coincide with settings indicated by the current state information, the supporting program 42 may execute the process at the arrow K without executing the process at the arrow J. It is noted that, in FIG. 3, descriptions of processes in case the cancel button 112 or 122 is operated or in case the reset button 113 or 123 is operated are omitted.

Figure 4B:
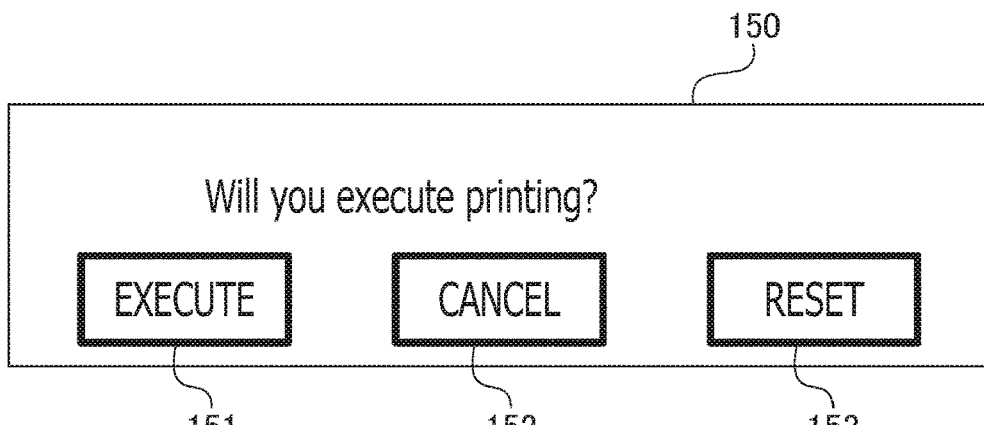

The supporting program 42 displays a confirmation screen after generating the processed intermediate image data in response to the operation of the continue button 111 or the continue button 121 (arrow L). For example, the supporting program 42 displays a dialogue 150 shown in FIG. 4B to make final confirmation to the user on whether to execute printing or not. The dialogue 150 includes an execute button 151, a cancel button 152 and a reset button 153. It is noted that, if the dialogue shown in FIG. 5A or FIG. 5B had been displayed, the process at the arrow L may be omitted since the user's intension to execute printing has already been confirmed through the operation of the continue button 111 or the continue button 121. In this case, the supporting program 42 operates in the same way as in the case where the execute button 151 is operated if the continue button 111 or 121 is operated, as in the case where the cancel button 152 is operated if the cancel button 112 or 122 is operated, and as in the case where the reset button 153 is operated if the reset button 113 or 123 is operated.

As shown in FIG. 3, when the execute button 151 is operated through the UI 20, the supporting program 42 determines which of the execution command based on the print instruction through the editing APP 43 and the execution command based on the preview instruction has been received from the general-use printing program 41 (arrow M). Specifically, when the execution command is delivered from the general-use printing program 41 to the first interface, the supporting program 42 determines that the execution command based on the print instruction is received. On the other hand, when the execution command is delivered from the general-use printing program 41 to the second interface, the supporting program 42 determines that the execution command based on the preview instruction is received. It is noted that, in case the supporting program 42 includes only one interface, the supporting program 42 can make similar determination based on the information attached to the execution command.

If it is determined that the execution command based on the print instruction is received, the supporting program 42 outputs, to the general-use printing program 41, an end notification to which a content to be printed (e.g., the processed intermediate image data) is attached (arrow N). The general-use printing program 41 generates print data in accordance with the content to be printed attached to the end notification (arrow O). For example, the general-use printing program 41 generates print data based on the processed intermediate image data attached to the end notification. The print data generated by the general-use printing program 41 is print data of a format that can be used in printing with various types of printers. The print data is, for example, PWG Raster format data or PDF format data. It is noted that a process of processing intermediate image data at the arrow K and a process of transmitting the processed intermediate image data to the general-use printing program 41 are examples of a processing process.

After the generation of the print data, the general-use printing program 41 transmits a print command to the printer 2 (arrow P). The printer 2 executes printing in accordance with the print data attached to the print command.

It is noted that the supporting program 42 may receive the print data generated by the general-use printing program 41 from the general-use printing program 41 and may edit the print data. For example, the supporting program 42 may add a command for causing the printer 2 to execute a function unique to the printer 2 to the print data. The function unique to the printer 2 includes, for example, a toner saving function and a finisher function. If the printer 2 has functions of adding watermarks, header/footer and the like to an image by itself, the supporting program 42 may add commands for causing the printer 2 to execute these functions to the print data. In case the supporting program 42 edits the print data, the supporting program 42 may output the edited print data to the general-use printing program 41, and the general-use printing program 41 may transmit a print command for causing the printer 2 to execute printing of the edited print data to the printer 2.

On the other hand, if it is determined that the execution command based on the preview instruction is received, the supporting program 42 outputs an end notification notifying that the process is to be terminated to the general-use printing program 41 (arrow Q). The end notification includes the processed intermediate image data. After the receipt of the preview instruction, upon receiving the end notification notifying that the process is to be terminated from the supporting program 42, the general-use printing program 41 determines that there is no need to generate print data. In this case, the general-use printing program 41 outputs a response notification to the editing APP 43 without generating print data (arrow R). The general-use printing program 41 outputs the response notification while attaching the processed intermediate image data included in the end notification to the response notification.

The editing APP 43 displays a preview in response to the response notification (arrow S). That is, the editing APP 43 causes the UI 20 to display an image indicated by the processed intermediate image data attached to the response notification. Since, as in the case where printing is to be executed, the processed intermediate image data is generated by the supporting program 42, the editing APP 43 can cause the UI 20 to display a preview similar to a printed result when the printing is actually performed.

It is noted that the supporting program 42 may attach the print parameters of which settings have been received at the arrow F, that is, print parameters which have been processed at the arrow F, to the end notification, and the general-use printing program 41 may deliver the response notification including the processed print parameters to the editing APP 43. When the next print instruction is received after displaying the preview at the arrow S, the editing APP 43 may attach the processed print parameters to the print execution notification. In this case, the processed print parameters are set in an area, which is prepared by a vender, of the print execution notification. The general-use printing program 41 may output an execution command to which the processed print parameters and the intermediate image data are attached the first interface of the supporting program 42. In this case, the supporting program 42 may reflect the print parameters attached to the execution command to the print parameter editing screen. According to this configuration, it becomes possible to reduce burden for the user to repeatedly perform the same print settings and thus it becomes possible to improve usability of the print system.

When editing an image on the image editing screen or making print settings on the print setting screen after the displaying of the preview, the editing APP 43 may reflect the processed print parameters to the image to be edited or to the print setting screen. According to this configuration, it becomes less likely that settings that are against the user's intention are repeatedly made.

Further, when the cancel button 152 in the dialogue 150 is operated through the UI 20, the supporting program 42 outputs an end notification notifying that the process is to be terminated to the general-use printing program 41 (arrow T). In this case, the supporting program 42 do not attach the processed intermediate image data to the end notification since there is no need to generate print data. In response to the end notification, the general-use printing program 41 aborts the printing process before generating print data (arrow U). Then, the general-use printing program 41 outputs a cancel notification to the editing APP 43 (arrow V). According to this configuration, it is expected that wasted printings that the user did not intend will be avoided.

It is noted that the editing APP 43 which received the cancel notification may cause the UI 20 to display the image editing screen to receive corrections of the image subjected to be printed, the print parameters that have been input to the print setting screen and the like. Then, the editing APP 43 may receive the print instruction or the preview instruction again.

As with the response notification at the arrow R, the processed intermediate image data may be attached to the cancel notification. In this case, as with the process at the arrow S, after the displaying of the preview, the editing APP 43 may display the image editing screen to receive editing of the image subjected to be printed, the print parameters that have been input to the print setting screen and the like.

On the other hand, when the reset button 153 is operated through the UI 20, the supporting program 42 outputs an end notification, notifying that the print parameters will be reset, to the general-use printing program 41 (arrow W). Upon receiving the end notification, the general-use printing program 41 receives resetting of the print parameters (arrows X and E). That is, for example, the editing APP 43 displays the print setting screen again. According to this configuration, since the user can correct the print parameters, it is expected that printings that are against the user's intention will be avoided.

When displaying the print parameter editing screen again, the settings when the resetting button 135 is operated may be reflected to the print parameter editing screen. In this case, since the user can change the settings while confirming the previous settings, usability of the print system improves. It is noted that default value of the print parameter may be displayed on the print parameter editing screen that is displayed again.

Figure 5A:
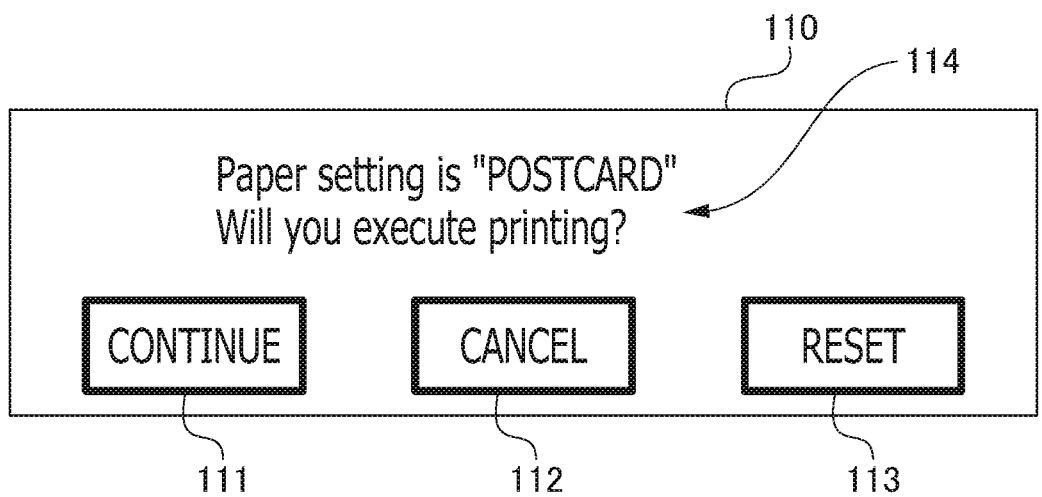
FIGS. 5A and 5B are diagrams of a UI showing examples of screens to be displayed.
Figure 5B:
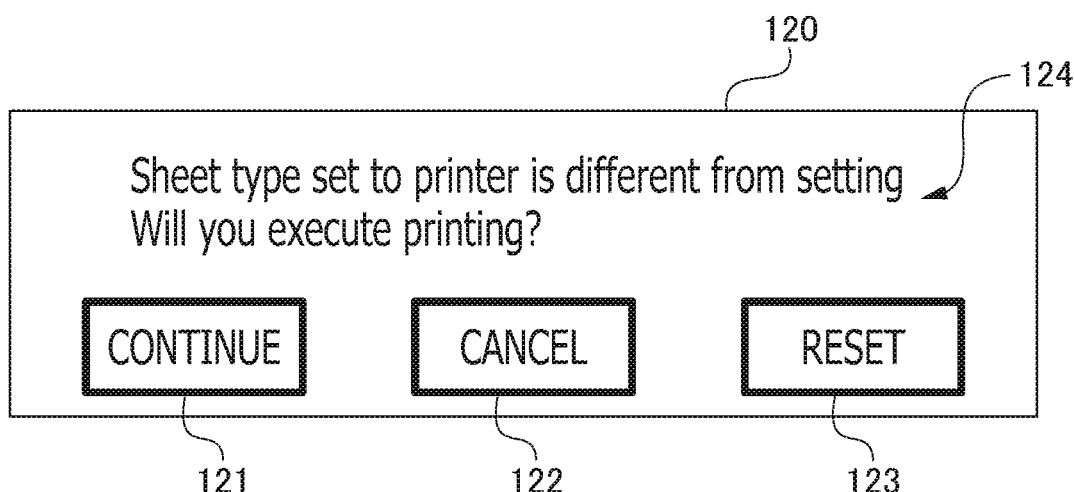

It is noted that, in case the message 114 or 124 is displayed as shown in FIG. 5A or FIG. 5B at the arrow J, when the user do not want to execute printing on the postcard or when the user do not want to execute printing on the standard paper, the user operates the cancel button 112 or 122 or the reset button 113 or 123 through the UI 20. In this case, since the supporting program 42 executes operations similar to those in the above-described case where the cancel button 152 is operated or operations similar to those in the above-described case where the reset button 153 is operated, wasted printings that are against the user's intention can be avoided.

As described above, if it is determined that the execution command based on the preview instruction is received, the supporting program 42 of the first embodiment does not cause the general-use printing program 41 to generate print data based on the processed intermediate image data. That is, print data will not be transmitted to the printer 2. In this case, the general-use printing program 41 outputs the response notification to which the processed intermediate image data is attached to the editing APP 43. Therefore, it becomes possible to display an image indicated by the processed intermediate image data on the editing APP 43 before executing printing and thus opportunities for the user to confirm an image which will be printed increase. As a result, it becomes less likely that printing based on an image to which processes that the user did not intend are made.

Furthermore, since the editing APP 43 displays a preview based on the processed intermediate image data which is generated in the same way as when executing printing, the preview by the editing APP 43 can reflect the settings of the watermark more accurately than in a case where the editing APP 43 displays a preview without using the supporting program 42. Therefore, even if the user confirms the preview by the editing APP 43 and inputs the print instruction, since it is less likely that the printed result is against the user's intention, redoing of the printing can be suppressed.

The supporting program 42 outputs the end notification to which the content to be printed is attached when the execution command based on the print instruction is received, and outputs the end notification notifying that the process it to be terminated when the execution command based on the preview instruction is received. That is, the content of the end notification which the supporting program 42 outputs to the general-use printing program 41 changes in accordance with the type of instruction the editing APP 43 receives. The general-use printing program 41 generates print data and transmits the print data to the printer 2 or outputs the response notification to the editing APP 43 in accordance with the content of the end notification. Therefore, the supporting program 42 can control whether to deliver the processed intermediate image data to the editing APP 43 or not in accordance with the execution command output from the general-use printing program 41 in accordance with the instruction that the editing APP 43 has received.

Second Embodiment

Hereinafter, referring to a sequential chart shown in FIG. 6, a print system using programs according to the second embodiment of the present disclosure will be described. The second embodiment differs from the first embodiment in that the supporting program 42 receives the print instruction and the preview instruction. The difference from the first embodiment will be described herein. It is noted that, in FIG. 6, the same numerals as those in FIGS. 2 and 3 are used for processes that are common to those in FIGS. 2 and 3.

The supporting program 42 which received the execution command displays the print parameter editing screen for receiving settings of the print parameters (arrow a). For example, as shown in FIG. 4A, the watermark editing screen 200, which is an example of the print parameter editing screen displayed by the supporting program 42, includes a print button 201, a cancel button 202 and a preview button 203.

Figure 4C:
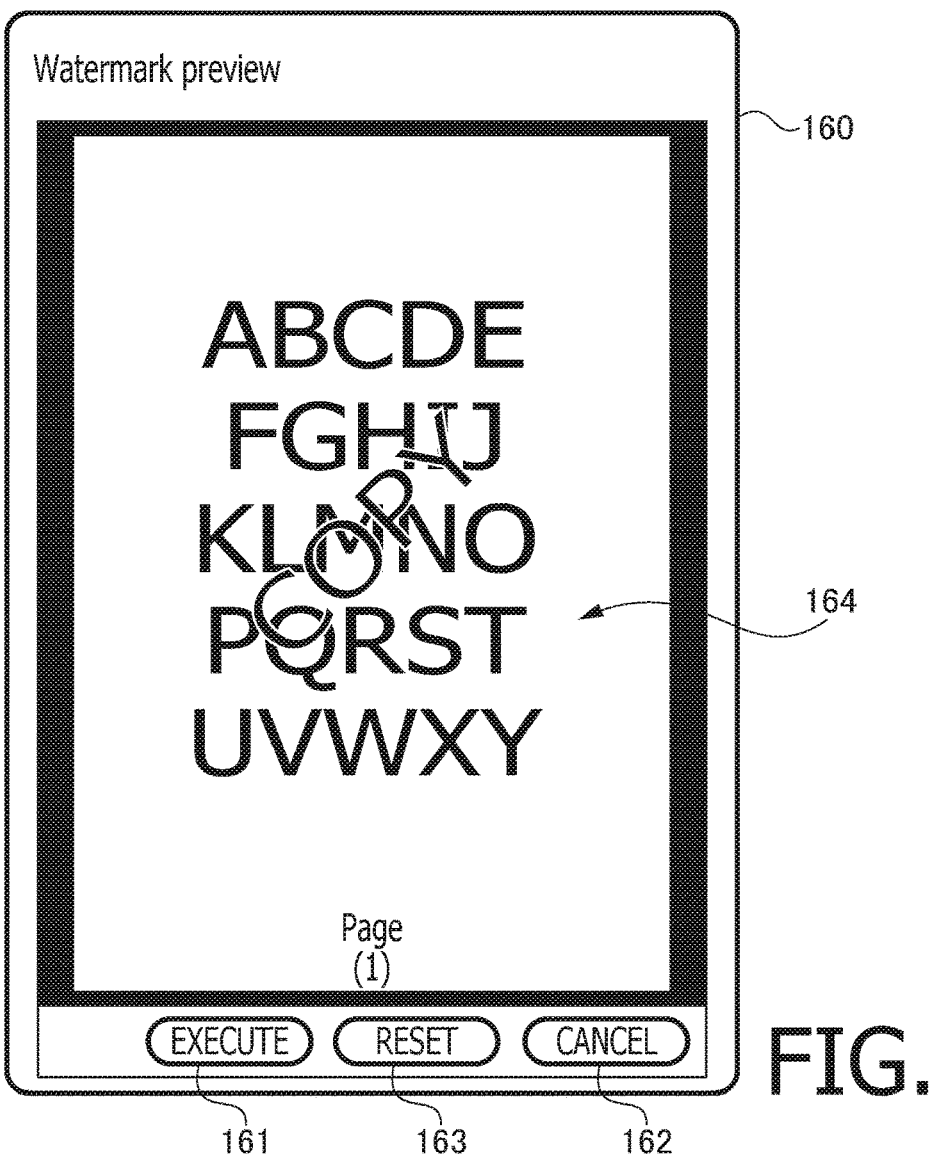

When an operation of the preview button 203 is received through the UI 20, the supporting program 42 generates the processed intermediate image data (arrow K) and displays a preview (arrow b). For example, when settings of a watermark is received at the arrow a, the supporting program 42 causes the UI 20 to display a confirmation screen 160 shown in FIG. 4C in accordance with the settings. The confirmation screen 160 includes an execute button 161, a cancel button 162, a reset button 163 and a preview image 164.

When an operation of the cancel button 162 is received through the UI 20, the supporting program 42 outputs an end notification notifying that the process is to be terminated to the general-use printing program 41 (arrow c). In this case, the supporting program 42 attaches, to the end notification, the processed intermediate image data that is generated when displaying a preview.

Upon receiving the end notification including the processed intermediate image data, the general-use printing program 41 aborts the printing process without generating print data (arrow d). Then, since the processed intermediate image data is attached to the end notification, the general-use printing program 41 outputs a response notification including the processed intermediate image data to the editing APP 43 (arrow e).

The editing APP 43 detects that printing has been aborted by receiving the response notification including the processed intermediate image data. In this case, after displaying an image indicated by the processed intermediate image data as a preview, the editing APP 43 may display the image editing screen and receive editing of the image and/or the print parameters.

On the other hand, when an operation of the execute button 161 is received through the UI 20, the supporting program 42 executes the processes at the arrows N-P to execute printing. When an operation of the reset button 163 is received through the UI 20, the supporting program 42 terminates the displaying of the confirmation screen 160, executes the processes at the arrows W, X and E and receives resetting of the print parameters.

Not operating the execute button 161 is an example of an image response condition. The end notification (arrow N) that is to be output when the execute button 161 is operated after the displaying of the preview is an example of second information. The end notification (arrow c) that is to be output when the cancel button 162 is operated after the displaying of the preview is an example of first information.

When an operation of the print button 201 included in the watermark editing screen 200, which is a screen displayed at the arrow a, is received through the UI 20, the supporting program 42 generates the processed intermediate image data (arrow K) and executes the processes at the arrows N-P to execute printing.

When an operation of the cancel button 202 included in the watermark editing screen 200 is received through the UI 20, the supporting program 42 executes the processes at the arrows T-V to abort the print job before the general-use printing program 41 generates print data.

As described above, in the second embodiment, the supporting program 42 displays a preview when the preview button 203 is operated and, when the execute button 161 is operated after the displaying of the preview, the general-use printing program 41 generates print data and transmits the print data to the printer 2. Further, when the cancel button 162 is operated after the displaying of the preview, the general-use printing program 41 does not generate print data based on the processed intermediate image data but outputs the response notification including the processed intermediate image data to the editing APP 43. Therefore, opportunities for the user to confirm an image indicated by the processed intermediate image data before executing printing increase and, as a result, it becomes more likely that printing based on an image to which processes that the user did not intend are made is avoided.

The supporting program 42 of the second embodiment changes the content of the end notification to be output to the general-use printing program 41 in accordance with whether the execute button 161 is operated or not after the displaying of a preview. The general-use printing program 41 changes the content of the response to the editing APP 43 in accordance with the content of the end notification. Therefore, the supporting program 42 can control whether to deliver the processed intermediate image data to the editing APP 43 or not in accordance with whether the execute button 161 has been operated or not.

It is noted that the present embodiment is only an illustrative example and is not intended to limit aspects of the present disclosures. Accordingly, the present disclosures can be modified or enhanced without departing from aspects of the disclosures. For example, the device connected to the PC 1 need not be limited to the printer but may be any device which has a printing function (e.g., an MFP, a copier, a facsimile machine and the like). Further, the number of printers connected to the PC 1 need not be limited to that in the illustrated example but may be one or three or more.

A module that executes each of the processes of the present embodiment is not limited to the supporting program 42 but may be a program that receives instructions from the OS 21 when executing printing using the general-use printing program 41 of the OS 21. For example, the module may be a print workflow app (i.e., Print workflow) of which specification is disclosed by Microsoft.

After the process at the arrow K shown in FIG. 3, the supporting program 42 may display the dialogue 150 (arrow L) after displaying the preview. In the process at the arrow L shown in FIG. 3, the supporting program 42 may display the confirmation screen 160 shown in FIG. 4C in place of the dialogue 150 shown in FIG. 4B. According to these configurations, since the user is made to confirm whether to execute printing based on the preview image, it is expected that printings that are against the user's intention will be suppressed. The displaying of the preview or the confirmation screen 160 may be executed when the execution command based on the print instruction through the editing APP 43 is received but may not be executed when the execution command based on the preview instruction is received.

When the generation of the processed intermediate image data at the arrow K shown in FIG. 3 is failed, the supporting program 42 may determine that there is a problem in the print parameters and execute the process at the arrow L.

The confirmation screen 160 need not be displayed separately from the print parameter editing screen (e.g., the watermark editing screen). Specifically, after the continue button 121 is operated (arrow K), displaying of the confirmation screen 160 (arrow L) may be omitted. For example, when the print button 201 in the watermark editing screen 200 shown in FIG. 4A has been operated, the supporting program 42 determines which of the execution command based on the print instruction and the execution command based on the preview instruction has been received (arrow M). and if it is determined that the execution command based on the print instruction has been received, the supporting program 42 may execute the processes at the arrows N-P shown in FIG. 3, and if it is determined that the execution command based on the preview instruction has been received, the supporting program 42 may execute the processes at the arrows Q-S. For example, the general-use printing program 41 may not attach the processed intermediate image data to the response notification at the arrow R.

Figure 6:
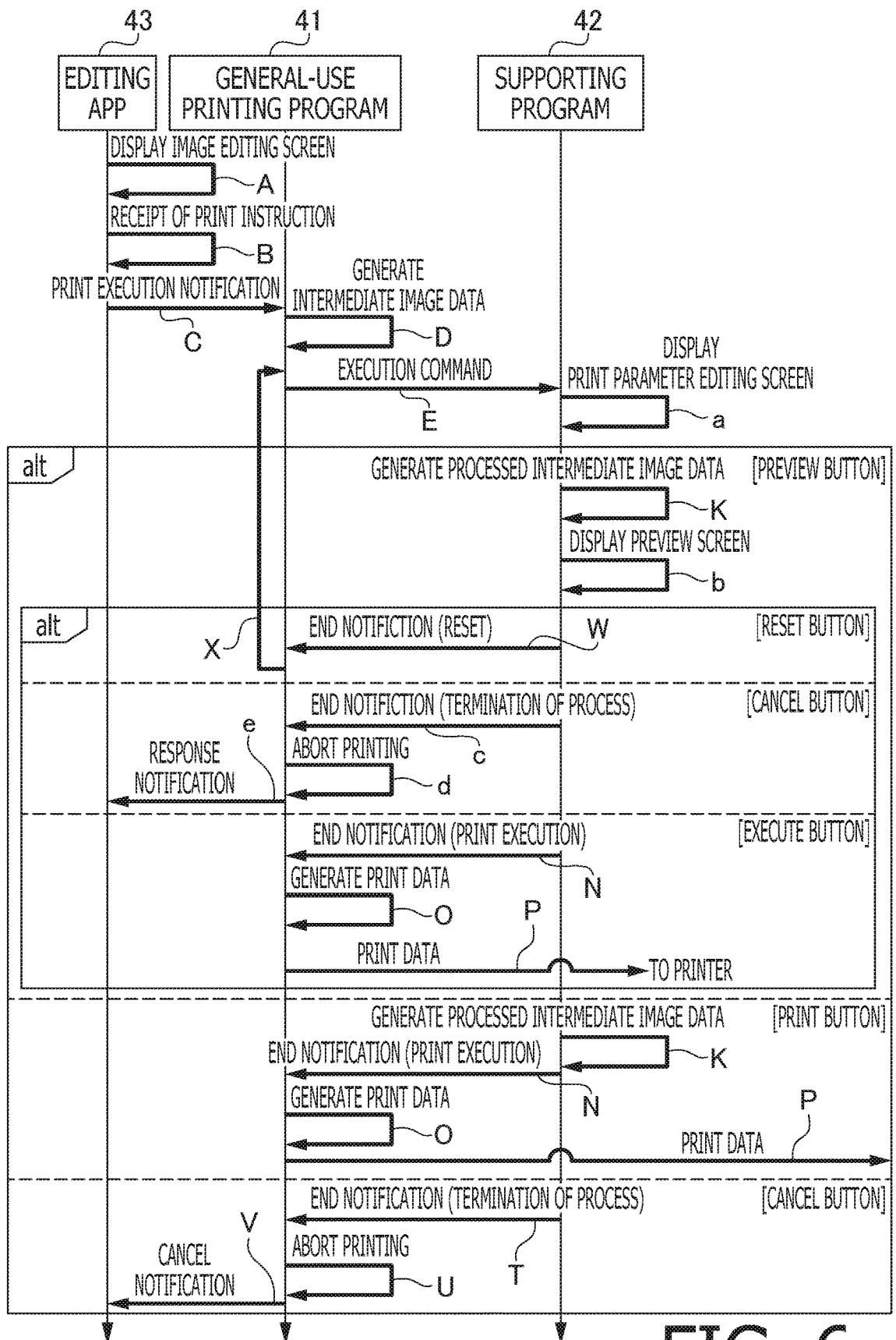
FIG. 6 is a sequential chart showing an example of an order of operations by respective programs which are used in a print system of a second embodiment.

In the processes shown in FIG. 2 and FIG. 3, as shown in FIG. 6, the supporting program 42 may display a preview in response to the operation of the preview button 203, and the general-use printing program 41 may generate print data and transmit the print data to the printer 2 or may transmit the response notification to the editing APP 43 without transmitting print data to the printer 2 in accordance with the operation of the buttons 161-163 of the confirmation screen 160 for confirming whether to display the preview.

In any of the sequential charts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, a general-use printing program being implemented in an operating system of the information processing apparatus, an application program being implemented in the information processing apparatus, the recording medium containing computer-executable programs realizing a supporting program corresponding to a printer connectable to the information processing apparatus, wherein, the supporting program causing, when executed by the controller, the information processing apparatus to perform:
 a receiving process when the general-use printing program receives a particular instruction from the application program, the application program being configured to input the particular instruction to the general-use printing program in a state where an image to be printed being designated through the application program, the receiving process being a process of receiving a processing setting used for processing the designated image, the particular instruction being an instruction to execute a particular process regarding the designated image; and
 a processing process of, based on the received processing setting, processing intermediate image data indicating the designated image into processed data;
 in a case of previewing, an outputting process of outputting the processed data, which is processed in the processing process based on the received processing setting, to the application program such that a preview based on the processed data is displayed by the application program; and
 in a case of printing, a further process using the processed data for printing.

2. The non-transitory computer-readable recording medium according to claim 1,
 wherein, in the processing process, a particular image representing particular information is combined with the designated image based on the processing setting.

3. The non-transitory computer-readable recording medium according to claim 1,
 wherein, in the processing process, a watermark is combined with the designated image based on the processing setting.

4. The non-transitory computer-readable recording medium according to claim 1,
 wherein the information processing apparatus comprises a display, and
 wherein, in the receiving process, a setting screen configured to receive a user input of the processing setting is displayed after the general-use printing program outputs the intermediate image data.

5. An information processing apparatus having a controller,
 wherein a general-use printing program is implemented in an operating system of the information processing apparatus,
 wherein a supporting program corresponding to a printer connectable to the information processing apparatus is implemented in the information processing apparatus,
 wherein an application program is implemented in the information processing, the application program being configured to receive a print instruction to cause the printer, through the general-use printing program, to execute printing of an image,
 wherein the controller performs:
 a receiving process when the general-use printing program receives a particular instruction from the application program, the application program being configured to input the particular instruction to the general-use printing program in a state where an image to be printed being designated through the application program, the receiving process being a process of receiving a processing setting used for processing the designated image, the particular instruction being an instruction to execute a particular process regarding the designated image; and
 a processing process of, based on the received processing setting, processing intermediate image data indicating the designated image into processed data;
 in a case of previewing, an outputting process of outputting the processed data, which is processed in the processing process based on the received processing setting, to the application program such that a preview based on the processed data is displayed by the application program; and
 in a case of printing, a further process using the processed data for printing.

6. The information processing apparatus according to claim 5,
 wherein, in the processing process, a particular image representing particular information is combined with the designated image based on the processing setting.

7. The information processing apparatus according to claim 5, wherein, in the processing process, a watermark is combined with the designated image based on the processing setting.

8. The information processing apparatus according to claim 5,
wherein the information processing apparatus comprises a display, and
wherein, in the receiving process, a setting screen configured to receive a user input of the processing setting is displayed after the general-use printing program outputs the intermediate image data.

9. A printing method to cause a printer connectable to an information processing apparatus to execute printing based on print data generated in the information processing apparatus, a general-use printing program being implemented in an operating system of the information processing apparatus, a supporting program corresponding to a printer connectable to the information processing apparatus being implemented in the information processing apparatus, an application program being implemented in the information processing, the application program being configured to receive a print instruction to cause the printer, through the general-use printing program, to execute printing of an image,
wherein the printing method includes an image processing method provided by the supporting program, the image processing method including:
receiving a processing setting when the general-use printing program receives a particular instruction from the application program, the application program being configured to input the particular instruction to the general-use printing program in a state where an image to be printed being designated through the application program, the processing setting being used for processing the designated image, the particular instruction being an instruction to execute a particular process regarding the designated image; and
based on the received processing setting, processing intermediate image data indicating the designated image into processed data;
in a case of previewing, outputting the processed data, which is processed in the processing process based on the received processing setting, to the application program such that a preview based on the processed data is displayed by the application program; and
in a case of printing, using the processed data for printing.

10. The printing method according to claim 9,
wherein, in the processing process, a particular image representing particular information is combined with the designated image based on the processing setting.

11. The printing method according to claim 9,
wherein, in the processing process, a watermark is combined with the designated image based on the processing setting.

12. The printing method according to claim 9,
wherein the information processing apparatus comprises a display, and
wherein, in the receiving process, a setting screen configured to receive a user input of the processing setting is displayed after the general-use printing program outputs the intermediate image data.

* * * * *